United States Patent [19]
Kirchmeyer et al.

[11] Patent Number: 5,889,065
[45] Date of Patent: Mar. 30, 1999

[54] PIGMENT PREPARATIONS

[75] Inventors: Stephan Kirchmeyer, Leverkusen; Michael Kressner, Leichlingen; Josef Leitermann, Leverkusen; Peter-Roger Nyssen, Dormagen; Christian Wamprecht, Neuss, all of Germany

[73] Assignee: Bayer Aktiengesellschaft, Leverkusen, Germany

[21] Appl. No.: 925,424

[22] Filed: Sep. 8, 1997

[30] Foreign Application Priority Data

Sep. 11, 1996 [DE] Germany ............ 196 36 898.7

[51] Int. Cl.$^6$ .................................. C08G 18/00
[52] U.S. Cl. .............. 521/99; 524/366; 524/284; 524/190; 524/589; 524/507; 524/871; 524/715; 524/755; 521/137; 521/124; 521/128; 106/499
[58] Field of Search ................ 524/366, 284, 524/190, 589, 507, 871, 715, 755; 521/137, 124, 128, 99; 106/499

[56] References Cited

U.S. PATENT DOCUMENTS

| | | | |
|---|---|---|---|
| 4,049,610 | 9/1977 | Bunge et al. | 260/31.2 N |
| 4,180,491 | 12/1979 | Kim et al. | 524/314 |

FOREIGN PATENT DOCUMENTS

| | | |
|---|---|---|
| 603546 | 6/1994 | European Pat. Off. . |
| 3115651 | 11/1982 | Germany . |
| 3803810 | 8/1989 | Germany . |
| 4236709 | 5/1994 | Germany . |

*Primary Examiner*—Rachel Gorr
*Attorney, Agent, or Firm*—Joseph C. Gil; Richard E. L. Henderson

[57] ABSTRACT

This invention relates to pigment preparations containing (a) a pigment,
(b) a monohydroxy ether, a polyether polyol, and/or a polyester polyol,
(c) a polyisocyanate addition product having an NCO content of <1.0 wt. % and 30 to 95 wt. % of ethylene oxide units arranged within polyether chains and derived from monofunctional alcohols (B) that is prepared at an NCO index of 100 to 600 by reacting
  (A) a polyisocyanate component having an (average) NCO functionality of 1.7 to 6 and an NCO content of 5 to 65 wt. % with
  (B) 5 to 100 equivalent %, based on (A), of monohydric poly-ether alcohols having a molecular weight of 150 to 10,000 and an ethylene oxide unit content of 40 to 99.5 wt. %,
  (C) 0 to 20 equivalent %, based on (A), of a monofunctional isocyanate-reactive compound other than monohydric alcohol (B),
  (D) 0 to 50 equivalent %, based on (A), of an isocyanate-reactive tertiary amine compound, and
  (E) 0 to 20 equivalent %, based on (A), of a formative component containing at least two NCO-reactive groups.

15 Claims, No Drawings

PIGMENT PREPARATIONS

BACKGROUND OF THE INVENTION

This invention relates to pigment preparations, a process for their preparation, a process for pigmenting organic macromolecular material, especially plastics based on polyurethane, and the use of pigment preparations comprising polyisocyanate addition products for pigmenting polyurethane foams.

Polyurethanes that can be used as paint binders or coating material, for example, for textiles, are produced in a wide range in the form of one- or two-component systems, in a highly flexible or rigid form, with or without a solvent content. If such materials are pigmented, it is a problem finding a suitable pigment vehicle in which the pigments can be dispersed in high concentration without flocculation and which is compatible with the various polyurethanes so that a specific pigment paste need not be tailored for each specific system. For the two-component systems that are customary in the paint industry, the only available pigmenting vehicle is usually the relatively low viscosity polyol component, in which not only carbon black or organic pigments such as phthalocyanines but also inorganic pigments such as iron oxide yellow or iron oxide red cannot be dispersed without flocculation and thixotropy. Not only does this make every grind problematical and uneconomical, but it also continues to have an adverse effect on flow, gloss, depth of shade, hiding power, and gloss durability of the cured paint films even after the isocyanate component has been added.

Polyurethane coating materials for textiles comprise very high molecular weight species which have only limited miscibility with one another (one- or two-component systems) and their viscosity alone makes it impossible to achieve high pigment concentrations.

In addition to these homogeneous polyurethanes, cellular polyurethanes, which can vary in their elasticity from rigid to extremely flexible foams, have attained great importance. These foams are mainly colored shortly before foaming in a mixing head in which polyols and polyisocyanates are intimately mixed with color pastes in the absence or presence of auxiliaries. The binders in these color pastes are usually polyester or polyether polyols which, however, have a pigment-holding capacity so low, especially with respect to carbon black, that the color pastes have high viscosities at carbon black concentrations as low as 10 to 18%. A normal addition of a color paste in a proportion of 3 to 5% by weight, based on the sum of all the ingredients of the foam, which is too low to affect the mechanical characteristics of the foam to any great extent, does not produce a deep color but, for example, in the case of carbon black, gives only a grey coloration.

To achieve deep colors in the material to be pigmented, to ensure meterability in the production of the material, and to minimize the effect of the binder on the mechanical characteristics of these materials, especially foams, it would be desirable to obtain readily pumpable pastes having high pigment contents.

A combination of good color-paste pumpability and flowability, coupled with the desired high pigment contents, also plays an important role in the production of the color pastes. Highly viscous and/or nonflowable pastes can be industrially produced only on roll mills or in kneaders; production using continuous stirred bead mills is not possible.

It is an object of the present invention to provide pigment preparations which have a very low viscosity and also good flow properties throughout the entire production process, especially in continuously stirred bead mills, and thus are particularly economical to produce.

The literature discloses several attempts to achieve these goals. German Offenlegungsschrift 3,115,651 discloses adding a polyvinylpyrrolidone to the polyether polyol binder as a viscosity-reducing additive German Offenlegungsschrift 3,803,810 discloses a copolymer of α-olefin and α,β-unsaturated dicarboxylic esters as binder additive. Further known additives for polyester polyol or polyether polyol binders include organotitanium compounds (German Offenlegungsschrift 4,236,709) and oil-modified polyurethanes (European Patent Application 603,546). German Offenlegungsschrift 2,402,839, by contrast, uses a carbodiimide-functional resin as pigment vehicle.

The prior art pigment preparations, however, have some disadvantages. For example, some additives or binder systems usually work only with certain pigments. Furthermore, the pigment tends to agglomerate in the known preparations, so that the desired color strength cannot be achieved in the material to be colored. With some of these preparations, undesirable agglomeration or aggregate formation occurs as a consequence of the dilution effect of the paste, for example, during the foaming process of polyurethane, the result of which is again that the desired color depth is not achieved. In addition, it is necessary to increase the color strength of the polyurethane foam to be pigmented while at the same time improving the viscosity and flow behavior of the preparation.

It has now been found that such disadvantages can be overcome with the pigment pastes of the invention.

SUMMARY OF THE INVENTION

This invention relates to pigment preparations comprising
a) a pigment,
b) a monohydroxy ether, a polyether polyol, a polyester polyol, or a mixture thereof,
(c) a polyisocyanate addition product containing polyether chains and urethane groups and, optionally, urea groups, wherein said polyisocyanate addition product has an isocyanate group content of not more than 1.0% by weight and contains 30 to 95% by weight of ethylene oxide units (molecular weight of 44 g/mol) arranged within polyether chains and derived from monofunctional alcohols (B) and is prepared at an NCO index of 100 to 600 by reaction of
(A) a polyisocyanate component having an (average) NCO functionality of 1.7 to 6 and an NCO content of 5 to 65% by weight with
(B) 5 to 100 equivalent %, based on the isocyanate groups of polyisocyanate component (A), of a monohydric alcohol consisting of at least one monohydric polyether alcohol having a molecular weight ranging from 150 to 10,000 g/mol (preferably 150 to 5,000 g/mol) and an ethylene oxide unit content of 40 to 99.5% by weight, said polyether alcohol being prepared by alkoxylation of a monofunctional initiator molecule,
(C) 0 to 20 equivalent %, based on the isocyanate groups of polyisocyanate component (A), of a monofunctional component consisting of at least one isocyanate-reactive compound different from monohydric alcohol (B) and having a molecular weight ranging from 32 to 5,000 g/mol,
(D) 0 to 50 equivalent %, based on the isocyanate groups of polyisocyanate component (A), of an amine component consisting of at least one compound containing a tertiary amine group and an isocyanate-reactive group and having a molecular weight ranging from 88 to 250 g/mol, and (E) 0 to 20 equivalent %, based on the isocyanate groups of polyisocyanate component (A), of a formative component containing at least two isocyanate-reactive groups and having a molecular weight ranging from 32 to 3,000 g/mol, wherein any excess NCO groups react with isocyanate-reactive groups in simultaneous or subsequent secondary reactions down to a residual NCO content of not more than 1.0% by weight.

DETAILED DESCRIPTION OF THE INVENTION

Component (c) is already known from prior application German Offenlegungsschrift 19,508,390, which was unpublished as of the priority date of the present invention.

Molecular weights as described herein are number average molecular weights (i.e. $\overline{M}_n$), unless otherwise indicated.

Component (c) of the pigment preparations of the invention acts as a dispersant and comprises reaction products of polyisocyanates (A) with monohydric alcohols (B) and the optional additional starting components (C), (D), and/or (E). Such reaction products contain urethane and, when reactive amines are used, urea groups and can optionally be freed from any excess isocyanate groups by means of secondary reactions that take place simultaneously with and/or subsequently to the addition reaction that gives rise to the urethane and optional urea formation.

Component (c) contains 30 to 95% by weight (preferably 40 to 75% by weight) of ethylene oxide units (molecular weight of 44 g/mol) incorporated from component (B). The content of free isocyanate groups in component (c) is below 1% by weight. In general, no free isocyanate groups are detectable.

Polyisocyanate component (A) used for preparing component (c) as an (average) NCO functionality of 1.7 to 6.0 (preferably greater than 2.5 and more preferably 3.0 to 6.0) and an NCO content of 5 to 65% by weight (preferably 7 to 30% by weight). The NCO functionality of poly-isocyanate components having an (average) NCO functionality of 1.7 to 2.5 is preferably raised, during the reaction with components (B) to (E), to greater than 2.5 by modification reactions.

Polyisocyanate component (A) consists of at least one organic polyisocyanate. Suitable polyisocyanates are unmodified polyisocyanates or modification products of conventional polyisocyanates, especially diisocyanates, which conform to the stated specifications with respect to NCO content and NCO functionality.

Unmodified polyisocyanates suitable for use as component (A) or as part of component (A) include, for example, the polyisocyanates of the diphenylmethane series, which are produced along with corresponding diisocyanates in the phosgenation of aniline/formaldehyde condensates, or conventional higher functional polyisocyanates such as, for example, 4,4',4"-triisocyanatotriphenylmethane.

In general, however, the polyisocyanates of component (A) consist of the aforementioned modification products of simple polyisocyanates. "Modification" in this context is to be understood as meaning especially the preparation of biuret, allophanate, and/or isocyanurate groups. Diisocyanates used for preparing such derivatives include, for example, hexamethylene diisocyanate, cyclohexane-1,3- and -1,4-diisocyanate and any mixtures of these isomers, 1-isocyanato-3,3,5-trimethyl-5-isocyanatomethylcyclohexane, 2,4- and 2,6-hexahydrotoluene diisocyanate and any mixtures of these isomers, perhydro-2,4'- and/or -4,4'-diphenylmethane diisocyanate, 2,4- and 2,6-toluene diisocyanate and any mixtures of these isomers, diphenylmethane 2,4'- and/or 4,4'-diisocyanate, and naphthylene 1,5-diisocyanate.

For the preparation of modified diisocyanates, particular preference is given to using the industrially important polyisocyanates, such as, for example, 2,4-diisocyanatotoluene and its technical grade mixtures with up to 35% by weight, based on the mixture, of 2,6-diisocyanatotoluene, 4,4'-diisocyanatodiphenylmethane and its technical grade mixtures with 2,4'- and 2,2'-diisocyanatodiphenylmethane, hexamethylene diisocyanate, or mixtures of these diisocyanates. The polyisocyanates of component (A) are most preferably the isocyanurate-functional modification products of 2,4-diisocyanatotoluene or its technical grade mixtures with up to 35% by weight, based on mixture, of 2,6-diisocyanatotoluene. These particularly preferred isocyanurate-functional polyisocyanates generally have an NCO content of 7 to 30% by weight combined with an NCO functionality of 3 to 6. Polyisocyanate component (A) is frequently used in the form of a solution in an inert solvent such as, for example, butyl acetate.

In a preferred embodiment, component (A) comprises polyisocyanates having an average functionality of 1.7 to 2.5, the modification reactions (i.e., the formation of biuret, allophanate, and/or isocyanurate groups) taking place during or after the reaction with components (B) to (E). Such modification reactions are known to persons skilled in the art and are described, for example, in Houben-Weyl, *Methoden der organischen Chemie*, Volume E20, "Makromolekulare Stoffe", ed. H. Bartl, J. Falbe, G. Thieme Verlag Stuttgart 1987, pages 1735, 1736, and 1739–1744.

The monohydric alcohol component (B) consists of at least one monohydric alcohol having a molecular weight (computable from the hydroxyl group content) of 150 to 10,000 g/mol (preferably 150 to 5,000 g/mol and more preferably 500 to 3,000 g/mol) and 40 to 99.5% by weight (preferably 70 to 99.5% by weight), based on the total weight of the monohydric alcohol, of ethylene oxide units incorporated within a polyether chain.

A particularly suitable component (B), or constituent of component (B), comprises conventional alkoxylation products of monofunctional initiator molecules which, per molecule, have on average at least 3 (preferably 7 to 250) alkylene oxide units which in turn comprise at least 40% by weight (preferably 70 to 100% by weight) of ethylene oxide units, based on the alkylene oxide unit.

Suitable initiator molecules for preparing the monohydric polyether alcohols preferably include monofunctional alcohols, phenols, or carboxylic acids. The initiator molecules generally have 1 to 30 (preferably 1 to 10 and more preferably 1 to 4) carbon atoms. Specific examples are alcohols, such as methanol, ethanol, isopropyl alcohol, n-butanol, 1-pentanol, 1-hexanol, 1-octanol, oleyl alcohol, or benzyl alcohol; phenols, such as phenol, cresols, methylphenols, nonylphenols, or dodecylphenols; alkoxylatable acids, such as acetic acid, butyric acid, capric acid, lauric acid, palmitic acid, or stearic acid; or cyclohexanecarboxylic acid. Preferred initiator molecules are monohydric alcohols of the above-exemplified type having 1 to 4 carbon atoms.

The conventional alkoxylation reaction is carried out using ethylene oxide or combinations of ethylene oxide with up to 60% by weight (preferably up to 30% by weight), based on the total amount of alkylene oxide, of other alkylene oxides such as, in particular, propylene oxide. If, in addition to ethylene oxide, other alkylene oxides are used, this can be accomplished using appropriate alkylene oxide mixtures or successive additions of the alkylene oxides with block formation.

Component (B) is used in an amount of 5 to 100 equivalent % (preferably 50 to 90 equivalent %), based on the isocyanate groups of component (A).

Optional component (C) consists of at least one other monofunctional compound that does not conform to the requirements of component (B) and which has an isocyanate-reactive group. Especially suitable for this purpose are the known monohydric alcohols such as methanol, ethanol, propanol, isopropyl alcohol, 1- and 2-butanol, isobutyl alcohol, 1-hexanol, 2-ethyl-1-hexanol, and the like, as well as monohydric ester alcohols having a molecular weight ranging from 94 to 350 g/mol, such as methyl hydroxybutyrate, ethylene glycol monoacetate, propyl lactate, or ethyl ($\omega$-hydroxycaproate, or monohydric alcohols having a molecular weight ranging from 146 to 2,000 g/mol that are obtained by conventional addition of $\epsilon$-caprolactone to monohydric alcohols of the above-exemplified type.

Component (C) is used in an amount of up to 10 equivalent %, based on the isocyanate groups of component (A).

Component (D) comprises organic compounds which, as well as having at least one tertiary amino group, have an isocyanate-reactive group, especially a hydroxyl or amino group. Such compounds generally have a molecular weight of 80 to 250 g/mol (especially 88 to 150 g/mol).

Examples of compounds suitable for use as component (D), or as constituent of component (D), are aminoalcohols such as N,N-diethylethanolamine, N,N-dimethylethanolamine, N,N-dimethylisopropanolamine N,N-dimethyl-1,3-propanediamine, N,N-diethylethylenediamine, 2-dibutylaminoethanol, 3-(dimethylamino)-1-propanol, 1-methylpiperazine, 1methyl-4-piperidinol, 2-morpholinoethanol, 2-piperidinoethanol, 2-piperazinoethanol, 2-piperazinoethylamine, 3-morpholinopropylamine, N,N-dibutyltrimethylenediamine, 3-(diethylamino)-1-propanol, N-methyl-3-pyrrolidinol, 2-(hydroxymethyl)-N-methylpiperidine, or polyamines having at least one tertiary amino group and a primary or secondary amino group. Examples of such compounds are N,N-dimethylethylenediamine, N,N-diethyl-1,4-butanediamine or N-methylpiperazine.

Preferred compounds for use as component (D) or as constituent of component (D) include 4-(2-hydroxyethyl) pyridine, 2-hydroxyethylmorpholine, N,N-dimethyl-1,3-propanediamine, N,N-diethyl-1,4-butanediamine, N,N-dimethylaminoethanol, and N,N-dimethylaminopropylamine.

Component (D) is used in an amount of from 0 to 50 equivalent % (preferably 10 to 50 equivalent %), based on the isocyanate group of component (A). Component (D) is preferably used in an amount such that the addition products that are essential to the invention contain 0 to 200 milliequivalents (preferably 0 to 100 milliequivalents) of tertiary amino groups per 100 g of solids.

The optional component (E) comprises organic compounds having a molecular weight ranging from 32 to 3,000 g/mol (preferably 118 to 2,000 g/mol) and containing two isocyanate-reactive groups, preferably two alcoholic hydroxyl groups. Examples include conventional polyester or polyether diols having the specified molecular weight range.

Component (E), if used at all, is used for the preparation of the polyisocyanate addition compounds according to the invention in an amount of up to 20 equivalent % (preferably up to 10 equivalent %), based on the isocyanate groups of component (A). It is particularly preferable not to use component (E).

The term "isocyanate index" as used herein refers to the quotient of the number of isocyanate groups divided by the number of isocyanatereactive groups, multiplied by 100.

Preferred pigment preparations of the invention are those in which the polyisocyanate addition product of component (c) is prepared at an NCO index of 100 to 130 by reaction of (A) a polyisocyanate component having an average NCO functionality of 3.0 to 6 and an NCO content of 7 to 30% by weight and consisting of isocyanurate-functional modification products of 2,4-diisocyanatotoluene or a mixture thereof with up to 35% by weight, based on the mixture, of 2,6-diisocyanatotoluene, with (B) 50 to 90 equivalent %, based on component (A), of an alcohol component of the type described above, (C) 0 to 20 equivalent %, based on the isocyanate groups of component (A), of an isocyanate-reactive monofunctional compound different from monohydric alcohol (B) having a molecular weight ranging from 32 to 5,000 g/mol, and (D) 10 to 50 equivalent %, based on component (A), of an amine component of the type described above, wherein the type and mixing ratios of the starting components, including urethane formation and the optional simultaneous or subsequent (i.e., subsequent to urethane formation) secondary reactions that reduce the level of any excess NCO groups down to a residual content of not more than 1.0% by weight, are chosen so that the polyisocyanate addition product has 40 to 75% by weight of ethylene oxide units incorporated from component (B).

Similarly preferred pigment preparations of the invention are those in which the polyisocyanate addition product of component (c) is prepared at an NCO index of 131 to 600 by reaction of (A) a polyisocyanate component having an average NCO functionality of 1.7 to 2.5 and an NCO content of 30 to 65% by weight and consisting of at least one isocyanate selected from the group consisting of 2,4-diisocyanatotoluene, 2,6-diisocyanatotoluene, 4,4'-diisocyanatodiphenylmethane, and 2,4'-diisocyanatodiphenylmethane, with (B) 5 to 50 equivalent %, based on component (A), of an alcohol component of the type described above, (C) 0 to 10 equivalent %, based on the isocyanate groups of component (A), of an isocyanate-reactive monofunctional compound different from monohydric alcohol (B) having a molecular weight ranging from 32 to 5,000 g/mol, and D) 0 to 20 equivalent %, based on component (A), of an amine component of the type described above, wherein the type and mixing ratios of the starting components, including urethane formation and the optional simultaneous or subsequent (i.e., subsequent to urethane formation) secondary reactions that reduce the level of any excess NCO groups down to a residual content of not more than 1.0% by weight, are chosen so that the polyisocyanate addition product has 40 to 75% by weight of ethylene oxide units incorporated from component (B).

The essential addition products can be prepared from the exemplified starting materials (A) to (E) according to various methods. In general, the reaction takes place in the melt at temperatures of 20 to 250° C. (preferably 60° to 140° C.). It is possible to prepare the addition products, for example, by reacting the isocyanate component (A) with a mixture of component (B) and optional components (C), (D), and/or (E), or alternatively by first preparing an NCO prepolymer from component (A) and a portion of reactants (B) to (E) and then reacting the prepolymer in a second step with the remainder of the isocyanate-reactive reactants.

Thereafter the NCO excess is reduced by secondary reactions to a residual level of not more than 1.0% by weight (preferably 0.5% by weight and more preferably 0% by weight). Examples of possible secondary reactions include the formation of allophanate groups, biuret groups, uretdione groups, or isocyanurate groups by appropriate addition or addition-polymerization reactions of the excess NCO groups. Such reactions are frequently catalyzed by the tertiary nitrogen atoms that are present and can be brought about, for example, by heating to 60° to 250° C. for 0.1 to 24 hours. Preferred secondary reactions are addition-polymerization reactions leading to the formation of uretdione groups and/or isocyanurate groups.

A particularly preferred secondary reaction is the addition polymerization of the excess NCO groups to form isocyanurate structures that form under catalysis of tertiary nitrogen atoms present in optional component (D) or by addition of further trimerization catalysts.

Suitable trimerization catalysts for trimerizing the excess NCO groups according to the process of the invention include all compounds hitherto used in the preparation of isocyanurate polyisocyanates. Specific examples are oxides such as lithium oxide or bis(tributyltin) oxide; alkoxides such as sodium methoxide or potassium tert-butoxide; phenoxides; hydrides such as sodium boranate; hydroxides such as quaternary ammonium, phosphonium, arsonium, or stibonium hydroxides or potassium hydroxide/crown ethers; amines such as triethylamine, benzyldimethylamine, Mannich bases of phenols, pyrazines, or 1-(2-hydroxyethyl) aziridine; amides such as acrylamides or carbamidic esters; aminimides such as N,N-dimethyl-N-(2-hydroxypropyl) laurinimide; phosphines such as tertiary phosphines; carboxylate such as sodium formate, potassium acetate, or tetraethylammonium 2-ethylhexanoate; borates; organometallic compounds; metal chelates; acids, including Lewis acids such as hydrochloride or aluminum chloride; Friedel-Crafts catalysts; or tetramethylammonium dibutyl phosphate. Good trimerization catalysts also include a number of combinations of substances which by themselves have little if any activity, such as tetramethylammonium iodide/(phenoxymethyl)oxirane, 1,4-diazabicyclo[2.2.2]octane/(phenoxymethyl)oxirane, or cyclohexyidimethylamineltetramethylammonium 2-ethylhexanoate. A detailed review of catalysts for the trimerization of isocyanate groups with appropriate references to the original literature is to be found in Houben-Weyl, *Methoden der organischen Chemie*, Volume E, 20 (1987), pages 1741–1751, Georg Thieme Verlag Stuttgart, New York.

Although the reaction, apart from minimal amounts of solvents optionally used for dissolving component (A), is advantageously performable in the melt, it is also possible to use inert solvents, for example, to reduce viscosity. Examples of suitable solvents are dimethylformamide, N-methylpyrrolidone, dimethylacetamide, acetone, 2-butanone, ethyl acetate, butyl acetate, methoxypropyl acetate, toluene, or mixtures of such solvents. In general, the solvents are removed in the course of the reaction or subsequently, for example, by distillation.

It is also optionally possible to use conventional catalysts for the isocyanate addition reaction. Specific examples are triethylamine, N,N-dimethylbenzylamine, or tin compounds such as tin(II) octoate or dibutyltin dilaurate.

In a preferred embodiment, the pigment preparations of the invention comprise a mixture of
(a) 5 to 80% by weight (preferably 10 to 60% by weight) of pigment,
(b) 5 to 90% by weight (preferably 5 to 80% by weight) of a monohydroxy ether, a polyether polyol, a polyester polyol, or a mixture thereof, and
(c) 0.5 to 20% by weight (preferably 1 to 10% by weight and more preferably 1 to 5% by weight) of the polyisocyanate addition product,
wherein the percentages are based on the total amounts of components (a) to (c).

The pigments (a) used in the pigment preparations of the invention are not subject to any restriction and can be either organic or inorganic. Examples of suitable organic pigments include azo, anthraquinone, and thioindigo pigments, and other polycyclic pigments, such as phthalocyanine, quinacridone, dioxazine naphthalenetetracarboxylic acid, perylenetetracarboxylic acid, or isoindoline pigments, as well as metal complex pigments or laked dyes such as Ca, Mg, or Al lakes of sulfo- and/or carboxyl-containing dyes, or carbon black, of which a large number are known, for example, from the Color Index, 2nd edition. Examples of suitable inorganic pigments include zinc sulfides, ultramarine, titanium dioxides, iron oxides, cobalt blue, chromium oxides, and chromate pigments. Preference is given to using carbon black, which is to be considered a pigment for the purposes of this invention.

Particularly preferred pigments for inclusion in the pigment preparations of the invention are, for example, phthalocyanine pigments, such as Pigment Blue 15 and Pigment Green 7, arylamide pigments, such as Pigment Yellow 83 and Pigment Yellow 17, monoazo pigments such as Pigment Red 48, lithole pigments, diazo condensation pigments, such as Pigment Red 166, and carbon blacks, zinc sulfide, and ultramarine. Very particular preference is given to carbon blacks having a BET surface area of 30 to 1500 $m^2/g$ (particularly 30 to 230 $m^2/g$), especially acidic carbon blacks and alkaline carbon blacks obtained by the gas or furnace process, and oxidatively or chemically after-treated carbon blacks.

The monohydroxy ether of component (b) is preferably a monohydroxyalkyl ether, especially a monohydroxyalkyl ether derived from homo-, co-, or block copolyether polyols obtained by reaction of ethylene oxide and/or propylene oxide with water or with low molecular weight polyfunctional alcohols having at least two hydroxyl groups or derived from low molecular weight polyfunctional alcohols having at least two hydroxyl groups, preferably two or more hydroxyl groups. Polyfunctional alcohols are to be understood as meaning especially aliphatic $C_2$–$C_6$ alcohols such as ethylene glycol, 1,2- or 1,3-propanediol, 1,2- or 1,4-butanediol, 1,6-hexanediol, glycerol, trimethylolpropane, or pentaerythritol. Particular preference is given to monohydroxy ethers, especially monohydroxy polyethers. Preferred monoalkyl ethers, especially mono($C_1$–$C_4$ alkyl) ethers, are those derived from diethylene lycol or from ethylene oxide and/or propylene oxide adducts with thylene glycol or 1,2- or 1,3-propanediol having a number average molecular weight of 62 to 5000 g/mol. Preferred monoalkyl hydroxy ethers are ethylene oxide and/or propylene oxide polyethers based on mono($C_1$–$C_4$ alkyl) alcohols, especially the monohydroxy ethers based on methanol, ethanol, isopropyl alcohol, n-propanol, or n-, sec-, or tert-butyl alcohol. Particular preference is given to mono($C_1$–$C_4$ alkyl) glycol ether, especially monomethyl, monoethyl, monoisopropyl, mono-n-propyl, mono-n-butyl, mono-sec-butyl, or mono-tert-butyl glycol ethers (especially mono-n-butyl ethylene glycol ether or mono-n-butyl diethylene glycol ether) as component (b).

Suitable polyether or polyester polyols are polyether or polyester polyols that are known for use as pasting or binding agents in pigment pastes or for use as formative components for polyurethanes. Particularly suitable are polyesters of phthalic acid or adipic acid and a diol and/or a monohydric alcohol having 1 to 18 carbon atoms such as are known, for example, from German Offenlegungsschrift 2,905,975, for example, polyethylene glycol and polypropylene glycol, and also especially normally liquid polyether polyols prepared by addition of ethylene oxide and/or propylene oxide to a polyol (see, for example, German Offenlegungsschrift 3,115,651).

In a preferred embodiment, the monohydroxy ether content of component (b) is 0 to 80% by weight (preferably 10 to 50% by weight). In a preferred embodiment, component (b) is liquid at room temperature.

Preference is given to preparations of the invention wherein the three components (a), (b) and (c) together account for more than 80% by weight (preferably more than 90% by weight) of the pigment preparations.

Component (c) is preferably soluble in component (b) in an amount exceeding 10 g per 100 g of component (b) at a temperature of 25° C.

In addition to components (a) to (c), the pigment preparations of the invention can contain further constituents customary for pigment preparations. Examples of such further constituents are diluents such as di/tributyl phosphate, glycol ethers, glycerol ethers, or methoxypropyl acetate, stabilizers, and/or preservatives.

Dicarboxylic esters that are not polyhydroxyfunctional, such as $C_1$–$C_4$-alkyl esters of adipic acid or of phthalic acid, are suitable as well.

Also suitable are amines and/or their salts having a number average molecular weight $\overline{M}_n$ of not more than 500 g/mol.

The invention further relates to a process for preparing the pigment preparations of the invention wherein, for example, component (c) is dissolved in component (b), after which component (a) is homogeneously mixed in and precomminuted (for example, by using a high speed stirrer or dissolver) at room temperature.

In a particularly preferred embodiment, component (c) is used in the form of a 10 to 80% strength solution in a portion of the pasting agent (b). Component (c), when used as the preferred liquid form, is easy to incorporate into the desired pasting agent and to dilute to the required concentration.

The mixing of components (a), (b) and (c) is preferably followed by a continuous or batchwise grinding to the desired finely divided pigment form in customary wet comminutors, such as kneaders, attritors, roll mills, dissolvers, rotor-stator mills, ball mills and, particularly preferably, high speed stirred bead mills having circulating velocities of 5 to 60 m/s (preferably 10 to 20 m/s) and containing grinding media that are 0.1 to 10 mm (preferably 0.5 to 2 mm) in size and which are composed of steel, glass, ceramic, sand, or plastic.

According to the invention, it is also possible to carry out the grinding with higher pigment concentrations than those of the finished reparation and, after the grinding, to set the desired final concentration by addition of further portions of component (b) and optional further additives.

In a preferred procedure, a precomminution or grinding step is replaced or followed by homogenization and wet comminution using a so-called jet disperser or high pressure homogenizer at pressures of 10 to 2500 bar (preferably 200 to 2500 bar). The process of jet dispersion is known, for example, from German Offenlegungsschrift 19,536,845 (not yet published). However, it is also possible to use other embodiments (so-called high pressure homogenizers) such as known, for example, from emulsion preparation, which operate according to the principle of high pressure letdown combined with impact comminution.

The addition of further additives can take place according to the invention before or after the pigment addition and also before or after the grinding or high pressure homogenization.

The invention further relates to a process for pigmenting organic macromolecular material, especially polyurethane foams, wherein the pigment preparations of the invention are incorporated into and thereby color such materials, especially polyurethane foams. To accomplish this purpose, a pigment preparation of the invention is added to the starting materials used to make a plastic material or is incorporated into the plastic (for example, in molten form) after it is formed by reaction of the starting materials. For pigmenting polyurethanes, for example, a pigment preparation of the invention is added to the polyol component or the polyisocyanate component or to their reaction mixture either before or during formation of the polyurethane that is to be pigmented. The remainder of the reaction can then be carried out in a conventional manner, that is, as for non-pigmented polyurethane plastics. Further information can be found for example in G. Oertel, *Kunststoff-Handbuch*, Vol. 7, "Polyurethane", Hanser Verlag Munich, Vienna, 1983, English edition 1985.

The coloring of polyurethane foams preferably takes place shortly before the foaming in a mixing head in which the polyols and polyisocyanates are intimately mixed with the pigment preparations of the invention in the presence or absence of auxiliaries.

The invention further relates to a process for pigmenting polyurethane foams, wherein a pigment preparation comprising a pigment and the polyisocyanate addition product is added to the polyol or polyisocyanate component or to their reaction mixtures before, during, or after the formation of the polyurethane.

Possible pigments include those mentioned above in the discussion of component (a) of the pigment pastes of the invention.

The pigment preparations according to the invention, which contain polyisocyanate addition product, can contain further additives comprising, for example, pasting agents such as the above-mentioned dicarboxylic esters that are not polyhydroxyfunctional or further customary additives as described above.

The pigment preparations according to the invention preferably contain the polyisocyanate addition product in an amount of 0.5 to 20% by weight (preferably 1 to 15% by weight and more preferably 1 to 10% by weight), based on the pigment preparation.

It is also possible to pigment other plastics such as, for example, polyvinyl chloride (PVC), polystyrene (PS), or polycarbonate (PC) with the pigment preparations of the invention.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Component A: 2,4-toluene diisocyanate (DESMODUR® T 100 from Bayer AG)

Component B: monohydric polyether alcohol having a molecular weight of 2250 and an ethylene oxide content of 87.5% by weight, prepared by alkoxylation of n-butanol using a mixture of ethylene oxide and propylene oxide Component D: N,N-dimethylethanolamine Example 1

200.0 g of component B were initially charged to a one-liter three-neck flask equipped with a stirrer, reflux condenser, and thermometer and dewatered. After adding 33.78 g of component A at 80° C., the mixture was stirred at 80° C. until an NCO content of about 5.4% was reached. Thereafter, 3.96 g of component D were added and stirred at 80° C. for 20 minutes. Subsequently, 0.2 g of 2,4,6-tris (dimethylaminomethyl)phenol was added and stirred at 80° C. until the IR spectrum showed that the NCO band had disappeared. The result was a polyisocyanate addition product that can be used as a dispersant.

Example 2

A polyaddition compound was prepared analogously to Example 1, except that no 2,4,6-tris(dimethylaminoethyl) phenol was added and stirring was continued until the IR spectrum showed that the NCO band had disappeared. The reaction time was about 10% longer than that leading to the product of Example 1.

Example 3 (Comparative Example)

A black pigment preparation containing 18% by weight of an alkaline pigment grade carbon black (component a) having a BET surface area of 45 m$^2$/g, a DBP (dibutyl phthalate) adsorption of 45 ml/100 g, and a pH of 9 and 82% by weight of an adipic ester (component b) was homogenized by means of a dissolver and thereafter ground for 30 minutes with cooling in a high-speed batchwise one-liter stirred bead mill (from Sussmeyer, Brussels) containing 2 mm glass beads.

The adipic ester, which was a reaction product of adipic acid with 1,2-propylene glycol, had an OH number of 167 mg of KOH/g, an acid number of 0.5 mg of KOH/g, and a viscosity of 190 to 200 mPa.s at 50° C.

The resultant preparation had such a high viscosity that industrial production on batchwise stirred bead mills would not be possible.

Color strength was assessed in a polyester urethane foam prepared as follows: A mixture of 200 g of a polyester of adipic acid, diethylene glycol, and trimethylolpropane having an OH number of 50 and 73.2 g of a mixture of 65% of 2,4-toluene diisocyanate and 35% of 2,6-toluene diisocyanate was admixed with 2 g of the pigment preparation, and the mixture was foamed by means of the customary addition of water and auxiliaries. The visual color strength was set equal to 100% and was used as comparison with the examples that follow.

The results of the color strength test, as well as flow properties and viscosity values at 23° C., of the preparations of Examples 3–5 are shown in Comparative Table 1.

Example 4

The same method as described in Example 3 was used to prepare a black pigment preparation containing 30% by weight of an acidic pigment grade carbon black (component a) having a BET surface area of 96 m$^2$/g, a DBP adsorption of 69 ml/100 g, and a pH of 2.5, 65.7% by weight of diethylene glycol monobutyl ether (component b), and 4.3% by weight of the polyisocyanate addition product of Example 1 (component c). The result, after grinding, was a very free flowing paste of very low viscosity and high color strength.

Example 5

The same method as described in Example 3 was used to prepare a black pigment preparation containing 30% by weight of the same acidic pigment grade carbon black as used in Example 4 (component a), 65.7% by weight of a mixture of 54.3% by weight of diethylene glycol monobutyl ether and 45.7% by weight of the same adipic ester as used in Example 3 (component b), and 4.3% by weight of the polyisocyanate addition product of Example 1 (component c). The result, after grinding, was a fluid paste of moderate viscosity and high color strength.

COMPARATIVE TABLE 1

| Example | Viscosity D = 7 s$^{-1}$ T = 23° C. (mPa · s) | Flow behavior | Color strength in polyester urethane foam (%) |
| --- | --- | --- | --- |
| 3 | about 19,000 | thixotropic viscid | 100 |
| 4 | 163 | very free flowing | 170–180 |
| 5 | 3,990 | slightly thixotropic free flowing | 180 |

Similar results were obtained upon repeating Examples 4 and 5 with the polyisocyanate addition product of Example 2 instead of that of Example 1.

Example 6

A red pigment preparation containing 50% by weight of an inorganic red pigment Color Index Pigment Red 101 (component a), 48% by weight of the same adipic ester as used in Example 3 (component b), and 2.0% by weight of the polyisocyanate addition product of Example 1 (component c) was completely homogenized by means of a dissolver at a speed of 4,000 min$^{-1}$ for 15 minutes at a temperature of about 40° C. The resulting preparation possessed good color strength not only in polyester foams but also in polyether urethane foams and, compared with a preparation without a dispersant (c) but the same pigment content, was better flowing and readily usable in continuous foaming processes The same result was obtained on using component (c) described in Example 2.

Example 7

A red pigment preparation containing 15% by weight of the monoazo pigment Color Index Pigment Red 48:3

(component a), 83% by weight of the same adipic ester as used in Example 3 (component b), and 2.0% by weight of the polyisocyanate addition product of Example 1 (component c) was homogenized by means of a dissolver and ground as described in Example 4.

Compared with a similarly prepared pigment preparation containing 15% by weight of the same color pigment and 85% by weight of the same adipic ester, the pigment preparation according to Example 7 had a better flowability and exhibited a distinctly lower viscosity of 8021 mPa.s compared with the 10,750 mPa.s viscosity of the comparative preparation (measured at 23° C. and a shear gradient of 7 s$^{-1}$). The color strength in the polyester urethane foam was higher than the control. The same result was obtained when using the component (c) described in Example 2.

Example 8

A blue pigment preparation containing 17.5% by weight of the copper phthalocyanine pigment Color Index Pigment Blue 15:3 (component a), 80.5% by weight of the same adipic ester as used in Example 3 (component b), and 2.0% by weight of the polyisocyanate addition product of Example 1 (component c) was homogenized by means of a dissolver and ground as described in Example 4.

The resulting preparation had adequate flowability and a viscosity of about 11,000 mPa.s (measured at 23° C. and a shear gradient of 7 s$^{-1}$) and achieved a high color strength in polyester urethane foams. The same result was obtained when using the component (c) described in Example 2.

What is claimed is:

1. A pigment preparation comprising
   (a) a pigment,
   (b) a monohydroxy ether, a polyether polyol, a polyester polyol, or a mixture thereof,
   (c) a polyisocyanate addition product containing polyether chains and urethane groups and, optionally, urea groups, wherein said polyisocyanate addition product has an isocyanate group content of not more than 1.0% by weight and contains 30 to 95% by weight of ethylene oxide units arranged within polyether chains and derived from monofunctional alcohols (B) and is prepared at an NCO index of 100 to 600 by reaction of
   (A) a polyisocyanate component having an (average) NCO functionality of 1.7 to 6 and an NCO content of 5 to 65% by weight with
   (B) 5 to 90 equivalent %, based on the isocyanate groups of polyisocyanate component (A), of a monohydric alcohol consisting of at least one monohydric polyether alcohol having a molecular weight ranging from 150 to 10,000 g/mol and an ethylene oxide unit content of 40 to 99.5% by weight, said polyether alcohol being prepared by alkoxylation of a monofunctional initiator molecule,
   (C) 0 to 20 equivalent %, based on the isocyanate groups of polyisocyanate component (A), of a monofunctional component consisting of at least one isocyanate-reactive compound different from monohydric alcohol (B) and having a molecular weight ranging from 32 to 5,000 g/mol,
   (D) 10 to 50 equivalent %, based on the isocyanate groups of polyisocyanate component (A), of an amine component consisting of at least one compound containing a tertiary amine group and an isocyanate-reactive group and having a molecular weight ranging from 88 to 250 g/mol, and
   (E) 0 to 20 equivalent %, based on the isocyanate groups of polyisocyanate component (A), of a formative component containing at least two isocyanate-reactive groups and having a molecular weight ranging from 32 to 3,000 g/mol, wherein any excess NCO groups react with isocyanate-reactive groups in simultaneous or subsequent secondary reactions down to a residual NCO content of not more than 1.0% by weight.

2. A pigment preparation comprising
   (a) a pigment,
   (b) a monohydroxy ether, a polyether polyol, a polyester polyol, or a mixture thereof,
   (c) a polyisocyanate addition product containing polyether chains and urethane groups and, optionally, urea groups, wherein said polyisocyanate addition product has an isocyanate group content of not more than 1.0% by weight and contains 30 to 95% by weight of ethylene oxide units arranged within polyether chains and derived from monofunctional alcohols (B) and is prepared at an NCO index of 100 to 130 by reaction of
   (A) a polyisocyanate component having an average NCO functionality of 3.0 to 6 and an NCO content of 7 to 30% by weight and consisting of isocyanurate-functional modification products of 2,4-diisocyanatotoluene or a mixture thereof with up to 35% by weight, based on the mixture, of 2,6-diisocyanatotoluene, with
   (B) 50 to 90 equivalent %, based on the isocyanate groups of polyisocyanate component (A), of a monohydric alcohol consisting of at least one monohydric polyether alcohol having a molecular weight ranging from 150 to 10,000 g/mol and an ethylene oxide unit content of 40 to 99.5% by weight, said polyether alcohol being prepared by alkoxylation of a monofunctional initiator molecule,
   (C) 0 to 20 equivalent %, based on the isocyanate groups of polyisocyanate component (A), of an isocyanate-reactive monofunctional compound different from monohydric alcohol (B) having a molecular weight ranging from 32 to 5,000 g/mol, and
   (D) 10 to 50 equivalent %, based on the isocyanate groups of polyisocyanate component (A), of an amine component consisting of at least one compound containing a tertiary amine group and an isocyanate-reactive group and having a molecular weight ranging from 88 to 250 g/mol, wherein the type and mixing ratios of the starting components are chosen so that the polyisocyanate addition product has 40 to 75% by weight of ethylene oxide units incorporated from component (B) and wherein any excess NCO groups react with isocyanate-reactive groups in simultaneous or subsequent secondary reactions down to a residual NCO content of not more than 1.0% by weight.

3. A pigment preparation comprising
   (a) a pigment,
   (b) a monohydroxy ether, a polyether polyol, a polyester polyol, or a mixture thereof,
   (c) a polyisocyanate addition product containing polyether chains and urethane groups and, optionally, urea groups, wherein said polyisocyanate addition product has an isocyanate group content of not more than 1.0% by weight and contains 30 to 95% by weight of ethylene oxide units arranged within polyether chains and derived from monofunctional alcohols (B) and is prepared at an NCO index of 131 to 600 by reaction of
   (A) a polyisocyanate component having an average NCO functionality of 1.7 to 2.5 and an NCO content of 30 to 65% by weight and consisting of at least one isocyanate selected from the group consisting of 2,4-diisocyanatotoluene, 2,6-diisocyanatotoluene, 4,4'-diisocyanatodiphenylmethane, and 2,4'-diisocyanatodiphenylmethane, with (B) 5 to 50 equivalent %, based on the isocyanate groups of polyisocyanate component (A), of a monohydric alcohol consisting of at least one monohydric polyether alcohol having a molecular weight ranging from 150 to 10,000 g/mol and an ethylene oxide unit content of 40 to 99.5% by weight, said polyether alcohol being prepared by alkoxylation of a monofunctional initiator molecule, (C) 0 to 10 equivalent %, based on the isocyanate groups of polyisocyanate component (A), of an isocyanate-reactive monofunctional compound different from monohydric alcohol (B) having a molecular weight ranging from 32 to 5,000 g/mol, and (D) 0 to 20 equivalent %, based on the isocyanate groups of polyisocyanate component (A), of an amine component consisting of at least one compound containing a tertiary amine group and an isocyanate-reactive group and having a molecular weight ranging from 88 to 250 g/mol, wherein the type and mixing ratios of the starting components are chosen so that the polyisocyanate addition product has 40 to 75% by weight of ethylene oxide units incorporated from component (B) and wherein any excess NCO groups react with isocyanate-reactive groups in simultaneous or subsequent secondary reactions down to a residual NCO content of not more than 1.0% by weight.

4. A pigment preparation according to claim 1 comprising a mixture of (a) 5 to 80% by weight of a pigment, (b) 5 to 90% by weight of a monohydroxy ether, a polyether polyol, a polyester polyol, or a mixture thereof, and (c) 0.5 to 20% by weight of the polyisocyanate addition product, wherein the percentages are based on the total amounts of components (a) to (c).

5. A pigment preparation according to claim 1 wherein pigment (a) is selected from the group consisting of azo pigments, anthraquinone pigments, thioindigo pigments, polycyclic pigments, metal complex pigments, laked dyes, inorganic pigments, carbon black, and mixtures thereof.

6. A pigment preparation according to claim 1 wherein the monohydroxy ether of component (b) is a monohydroxyalkyl ether derived from a homopolyether, copolyether, or block copolyether polyol obtained by reaction of ethylene oxide and/or propylene oxide with water or with a low molecular weight polyfunctional alcohol having at least two hydroxyl groups or derived from a low molecular weight polyfunctional alcohol having at least two hydroxyl groups.

7. A pigment preparation according to claim 1 wherein the monohydroxy ether of component (b) is a mono($C_1$–$C_4$ alkyl) glycol ether.

8. A pigment preparation according to claim 7 wherein the mono($C_1$–$C_4$ alkyl) glycol ether is a monomethyl, monoethyl, monoisopropyl, mono-n-propyl, mono-n-butyl, mono-sec-butyl, or mono-tert-butyl glycol ether.

9. A process for preparing a pigment preparation according to claim 1 comprising homogenizing a mixture of components (a), (b) and (c) and grinding the resultant homogenized mixture in a wet comminutor.

10. A process according to claim 9 wherein the wet comminutor is a jet disperser or high pressure homogenizer having working pressures of 10 to 2500 bar.

11. A process for pigmenting an organic macromolecular material comprising incorporating a pigment preparation according to claim 1 into said organic macromolecular material.

12. A process for mass coloration of a plastic comprising incorporating a pigment preparation according to claim 1 into a molten plastic or adding a pigment preparation according to claim 1 to the starting components of the plastic prior to polymerization.

13. A process for pigmenting a polyurethane comprising adding, either before or during the formation of the polyurethane, a pigment preparation according to claim 1 to the polyol starting material or the polyisocyanate starting material used to prepare the polyurethane or to a mixture thereof.

14. An organic macromolecular material pigmented with a pigment preparation of claim 1.

15. A method for pigmenting a polyurethane foam comprising adding to the polyurethane foam a pigment preparation comprising (a) a pigment, (b) a monohydroxy ether, a polyether polyol, a polyester polyol, or a mixture thereof, (c) a polyisocyanate addition product containing polyether chains and urethane groups and, optionally, urea groups, wherein said polyisocyanate addition product has an isocyanate group content of not more than 1.0% by weight and contains 30 to 95% by weight of ethylene oxide units arranged within polyether chains and derived from monofunctional alcohols (B) and is prepared at an NCO index of 100 to 600 by reaction of (A) a polyisocyanate component having an (average) NCO functionality of 1.7 to 6 and an NCO content of 5 to 65% by weight with (B) 5 to 100 equivalent %, based on the isocyanate groups of polyisocyanate component (A), of a monohydric alcohol consisting of at least one monohydric polyether alcohol having a molecular weight ranging from 150 to 10,000 g/mol and an ethylene oxide unit content of 40 to 99.5% by weight, said polyether alcohol being prepared by alkoxylation of a monofunctional initiator molecule, (C) 0 to 20 equivalent %, based on the isocyanate groups of polyisocyanate component (A), of a monofunctional component consisting of at least one isocyanate-reactive compound different from monohydric alcohol (B) and having a molecular weight ranging from 32 to 5,000 g/mol, (D) 0 to 50 equivalent %, based on the isocyanate groups of polyisocyanate component (A), of an amine component consisting of at least one compound containing a tertiary amine group and an isocyanate-reactive group and having a molecular weight ranging from 88 to 250 g/mol, and (E) 0 to 20 equivalent %, based on the isocyanate groups of polyisocyanate component (A), of a formative component containing at least two isocyanate-reactive groups and having a molecular weight ranging from 32 to 3,000 g/mol, wherein any excess NCO groups react with isocyanate-reactive groups in simultaneous or subsequent secondary reactions down to a residual NCO content of not more than 1.0% by weight.

* * * * *